Feb. 26, 1963 P. WINCHELL 3,079,486
ELECTRICAL HEATER FOR A CONTAINER
Filed May 22, 1961 2 Sheets-Sheet 1
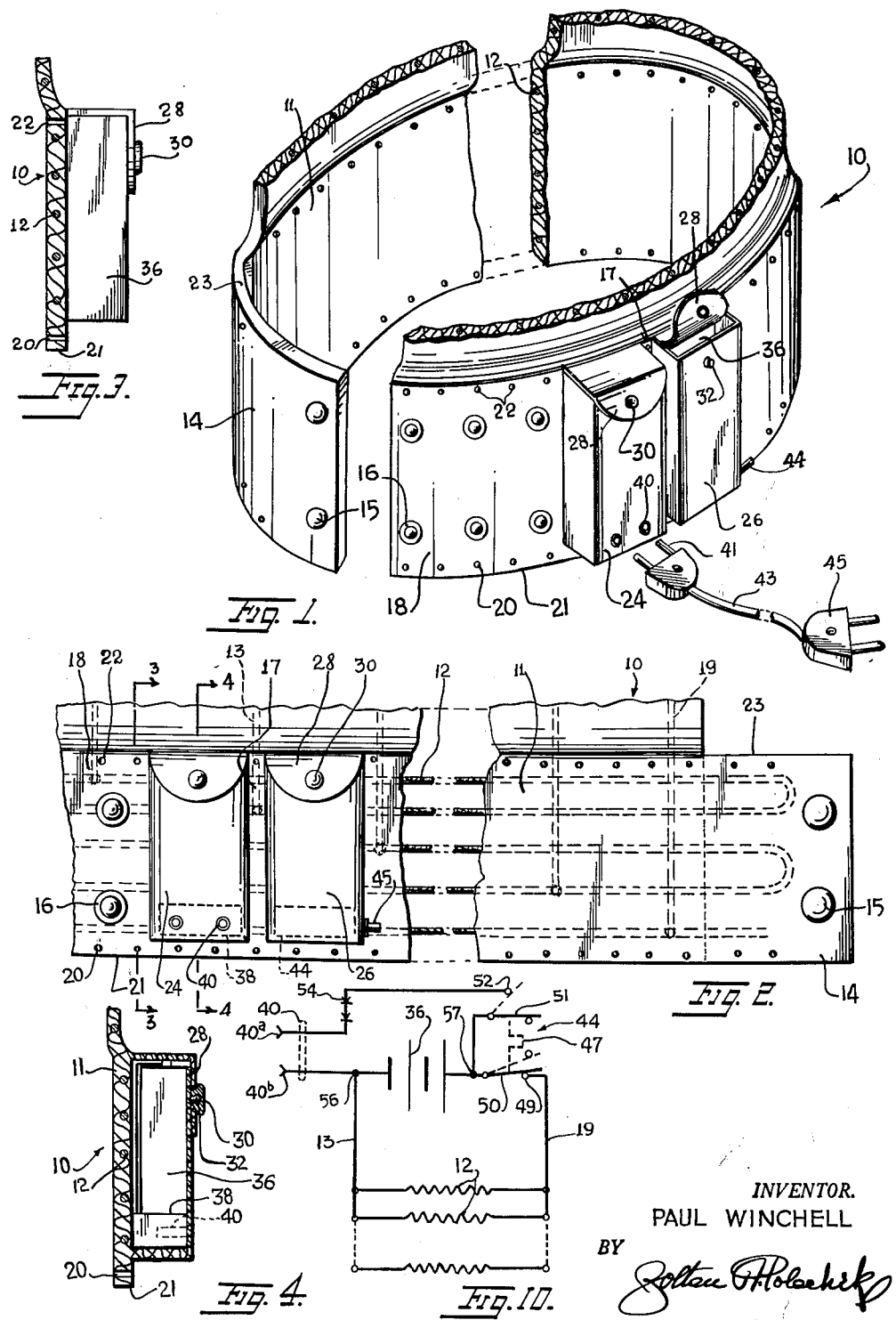
INVENTOR.
PAUL WINCHELL
BY
ATTORNEY Feb. 26, 1963  P. WINCHELL  3,079,486
ELECTRICAL HEATER FOR A CONTAINER
Filed May 22, 1961  2 Sheets-Sheet 2
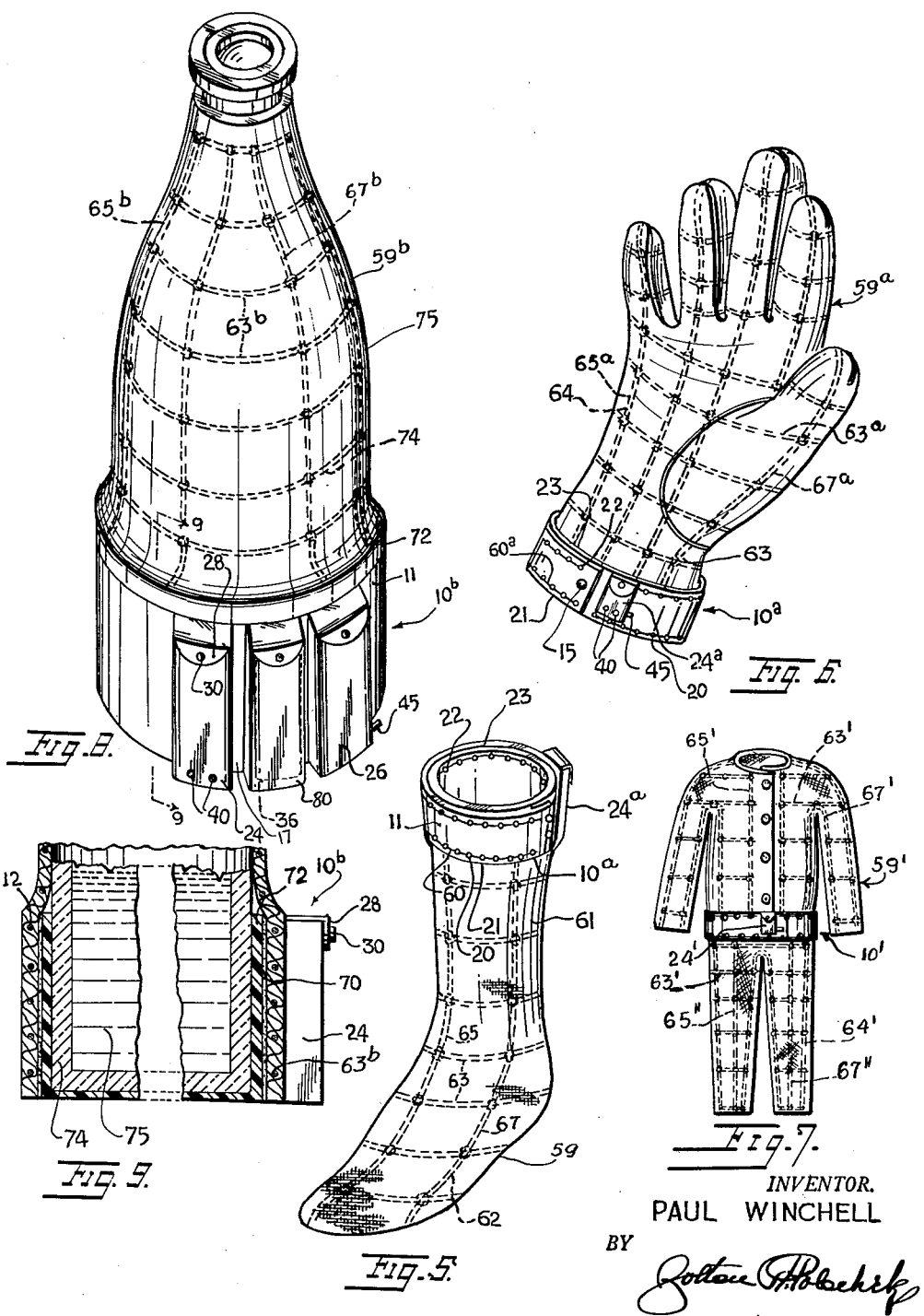
INVENTOR.
PAUL WINCHELL
BY
*Jottou Holcheck*
ATTORNEY

United States Patent Office 3,079,486
Patented Feb. 26, 1963

3,079,486
ELECTRICAL HEATER FOR A CONTAINER
Paul Winchell, 9—65 166th St., Whitestone, N.Y.
Filed May 22, 1961, Ser. No. 111,658
2 Claims. (Cl. 219—46)

This invention relates generally to heaters and more particularly to a portable heater for heating articles of clothing, containers, and sundry articles individually.

According to one form of the invention, an enclosure member shaped substantially the same as the article to be heated carries an electric battery and is adapted to be heated by the battery and placed in snug engagement around the article for heating the article by radiation. The enclosure member is readily placed on and removed from the article to be heated.

A principal object of the present invention is to provide a self-contained heater device shaped so as to be placed over the article to be heated, and embodying all of the heating elements necessary to heat the article.

Another object is to provide a heater for individually heating articles of clothing, containers of food and the like and other articles when the house supply of electricity is not available or convenient.

The invention is especially adapted for heating articles of clothing such as socks, mittens, gloves, shoes, underwear, hats, caps, ear muffs, and the like; and also for heating containers such as bottles, lunch boxes and the like in order to keep the contents thereof heated; and for keeping bread, rolls and the like in containers in heated condition.

The invention contemplates according to a modification to provide a heater with an electric battery having means for recharging the same.

A further object of the invention is to provide a heater device adapted to heat sundry articles individually that is efficient for the purposes intended.

For further comprehension of the invention and of the objects and advantages thereof, reference will be had to the following description and accompanying drawings, and to the appended claims in which the various novel features of the invention are more particularly set forth.

In the accompanying drawing forming a material part of this disclosure:

FIG. 1 is a front perspective view of a heater device embodying one form of my invention, a plug device for recharging the batteries being shown in position ready to be attached to the battery, parts being shown broken away.

FIG. 2 is a top plan view thereof in flattened out condition, parts being broken away.

FIG. 3 is a vertical sectional view taken on the line 3—3 of FIG. 2.

FIG. 4 is a vertical sectional view taken on the line 4—4 of FIG. 2.

FIG. 5 is a front perspective view of a heater device embodying a modified form of the invention in operative position on a sock.

FIG. 6 is a front perspective view of a heater device embodying a further modified form of the invention in operative position on a glove.

FIG. 7 is a front perspective view of still another modified form of the invention in operative position on pajamas.

FIG. 8 is a front perspective view of yet another modified form of the invention in operative position on a bottle.

FIG. 9 is a vertical sectional view taken on the line 9—9 of FIG. 8, parts being shown broken away.

FIG. 10 is a diagrammatic view showing the electric circuit.

Referring to FIGS. 1–3, there is shown a heating device or apparatus 10 including a band 11 of suitable fabric material, such as blanket material and the like in which is embedded a plurality of resistance heating wires 12. The wires are insulated from each other by the dielectric material of the body of the band. At one end 14 of the band there are snap fastener members 15 adapted to adjustably engage mating fasteners 16 disposed on the other end 18 of the band. Holes 20, 22 are provided along opposite edges 21, 23 of the band for receiving sewing thread or other fastening means to attach the band to an article to be warmed by the device.

Integrally formed with the band 11 are one or more pockets 24, 26 provided with integral closure flaps 28. The flaps have snap fasteners 30 engageable with fastener elements 32 integrally formed in outer sides of the pockets. An electric battery 36 is disposed in each pocket. In one pocket there is a rectifier assembly 38 having a receptacle 40 with openings for receiving the prongs 41 of a plug of a power cord 43 of a plug 45 which may be connected to a power supply for recharging the batteries. A switch 44 may be disposed in pocket 26. If necessary, all electrical components can be disposed in a single pocket along with the battery. Alternatively, more than two batteries may be disposed in a single pocket or more than two pockets may be provided. The pockets are connected by a web 17. Switch button 44 protrudes from pocket 26 for turning the batteries on and off.

In FIG. 10 there is shown the electrical circuit of the device. It will be noted that resistance elements 12 are connected in parallel to terminals of the serially connected batteries 36 by conductors 13 and 19 tapped off the elements 12. Switch 44 is preferably a double-pole double-throw switch with one stationary contact 49 adapted to be closed by movable contact 50 when movable contact 51 is open with respect to stationary contact 52 and vice versa. Rectifiers 54 are connected in series with contact 52 and with one terminal 40ª of the receptacle 40. The other terminal 40ᵇ of the receptacle is connected to terminal 56 of the batteries. Both movable contacts 50, 51 are connected to terminal 57 of the batteries.

FIG. 10 shows the battery circuit closed for energizing the resistance wires 12. When the switch 44 is thrown to its open position by actuating switch button 47, the power supply circuit of wires 12 is open and the battery recharging circuit via movable contact 51 and contact 52 is closed to receive energy from the plug 45.

FIG. 5 shows a modified form of heater device 10ª having a single battery in pocket 24ª forming one end of an enclosure member 59 adapted to fit over a sock 62 and secured to the ankle portion 61 of the sock by stitching 60. The body of the enclosure member 59 has transverse heating wires 63 embedded therein. The wires 63 are in electrical contact with a conductor 65 leading from the positive side of the battery in pocket 24ª and with a conductor 67 connected to the negative side. The entire sock is accordingly heated.

In FIG. 6 the device 10ª is secured to one end of an enclosure member 59ª shown enclosing a glove 64, and is secured to the wrist 63 of the glove by stitching 60ª. The enclosure member supports cross heating wires 63ª connected to conductors 65ª and 67ª connected to the positive and negative sides of the battery 24ª.

FIG. 7 illustrates the device 10′ secured to the middle on a one-piece closure member 59′ shown enclosing an article of underwear such as pajamas 64′. The upper portion of the pajamas support cross heating wires 63′ connected to the positive and negative sides of the battery 24′ by conductors 65′ and 67′ and the lower cross heating wires 63′ are connected to the positive and negative sides of the battery by conductors 65″ and 67″.

In FIGS. 8 and 9, the device 10ᵇ is shown secured to one end of a cover body 59ᵇ for heating a bottle 74. In this form of the invention, the device 10<sup>b</sup> is attached by a cement layer 70 to a cup 72. The bottle containing milk 75 or the like is placed in the cup. The cover body is provided with cross heating wires 63<sup>b</sup> which are connected to the positive and negative sides of the batteries 24, 26 and 80 which are connected in series by conductors 65<sup>b</sup> and 67<sup>b</sup>, respectively and controlled by switch button 45.

Alternatively, the cup 72 may be provided with a cover and used as a lunch box. Numerous other applications of the invention will readily occur to users thereof. The invention may be of especial utility to uniformed personnel such as policemen, soldiers, workers in the refrigeration warehouses, persons in frigid climates etc. The invention is particularly directed at a heating device which is comparatively light in weight and portable. It employs batteries which are conveniently and inexpensively rechargeable when required.

While I have illustrated and described the preferred embodiments of my inventions, it is to be understood that I do not limit myself to the precise constructions herein disclosed and that various changes and modifications may be made within the scope of the appended claims.

Having thus described my invention, what I claim as new, and desire to secure by United States Letters Patent is:

1. A heater for a container in the form of a bottle, said heater comprising a cup for receiving the bottom of a bottle, an elongated fabric cover body shaped to conform to the shape of a cylindrical bottle, an annular band connected to the periphery of the cup, an electric battery supported by said band, heating wires embedded in the cover body and band and extending thereacross, conductors extending longitudinally of the cover and connected to the battery and to the heating wires, and a switch for controlling the battery.

2. A heater for a container in the form of a bottle, said heater comprising a plastic cup open at the top to receive the bottom of a bottle, an elongated fabric cover body shaped to conform to the shape of the bottle, a fabric band secured around the cup, heating wires embedded in the cover body and band, a pocket supported on the outside of said band, a battery mounted in said pocket and means of electrical connection between the battery and heating wires, and a switch for controlling the circuit including the battery and wires.

References Cited in the file of this patent

UNITED STATES PATENTS

| | | |
|---|---|---|
| 1,183,264 | Woodrow | May 16, 1916 |
| 1,455,287 | Hadley | May 15, 1923 |
| 1,820,602 | Dick | Aug. 25, 1931 |
| 1,992,593 | Whitney | Feb. 26, 1935 |
| 2,329,766 | Jacobsen | Sept. 21, 1943 |
| 2,516,637 | McCollum | July 25, 1950 |
| 2,526,447 | Aiken | Oct. 17, 1950 |
| 2,570,376 | Quist | Oct. 9, 1951 |
| 2,584,302 | Stein | Feb. 5, 1952 |
| 2,692,326 | Crowell | Oct. 19, 1954 |
| 2,718,585 | Hariu | Sept. 20, 1955 |
| 2,993,979 | Hornsby | July 25, 1961 |